United States Patent [19]

Sattel

[11] Patent Number: 4,559,027
[45] Date of Patent: Dec. 17, 1985

[54] CHAIN TIGHTENER FOR DRIVE CHAIN

[75] Inventor: John A. Sattel, Janesville, Wis.

[73] Assignee: Spacesaver Corporation, Fort Atkinson, Wis.

[21] Appl. No.: 670,130

[22] Filed: Nov. 9, 1984

Related U.S. Application Data

[63] Continuation-in-part of Ser. No. 380,653, May 21, 1982, abandoned.

[51] Int. Cl.⁴ ............................................. F16H 7/14
[52] U.S. Cl. .................................... 474/116; 312/199; 474/113
[58] Field of Search ............... 474/113, 114, 116, 136; 74/212; 104/165; 105/29 R; 312/199, 200, 201

[56] References Cited

U.S. PATENT DOCUMENTS

| | | | |
|---|---|---|---|
| 1,269,034 | 6/1918 | Woodworth | 474/116 X |
| 1,720,423 | 7/1929 | Masury | 474/116 X |
| 1,906,415 | 5/1933 | Rauch | 474/116 X |
| 2,652,785 | 9/1953 | Cox | 105/29 R |
| 3,923,354 | 12/1975 | Young | 312/201 |
| 3,944,309 | 3/1976 | Taniwaki | 312/198 |

FOREIGN PATENT DOCUMENTS

| | | | |
|---|---|---|---|
| 696130 | 10/1964 | Canada | 312/199 |
| 2067146 | 7/1981 | United Kingdom | 312/200 |

Primary Examiner—Leslie A. Braun
Assistant Examiner—Dwight G. Diehl
Attorney, Agent, or Firm—Fuller, House & Hohenfeldt

[57] ABSTRACT

In manually operated mobile storage apparatus which moves back and forth in guided movement by floor mounted tracks and which includes a manually operable drive wheel accessible by the user and connected to a storage unit drive shaft by a chain there is provided a chain tensioning device to eliminate slack and provide the appropriate tension. The chain tensioning device comprises a bearing block with a roller bearing which is journalled on the shaft and which can be drawn by bolts to deflect the shaft and tighten the chain.

4 Claims, 4 Drawing Figures

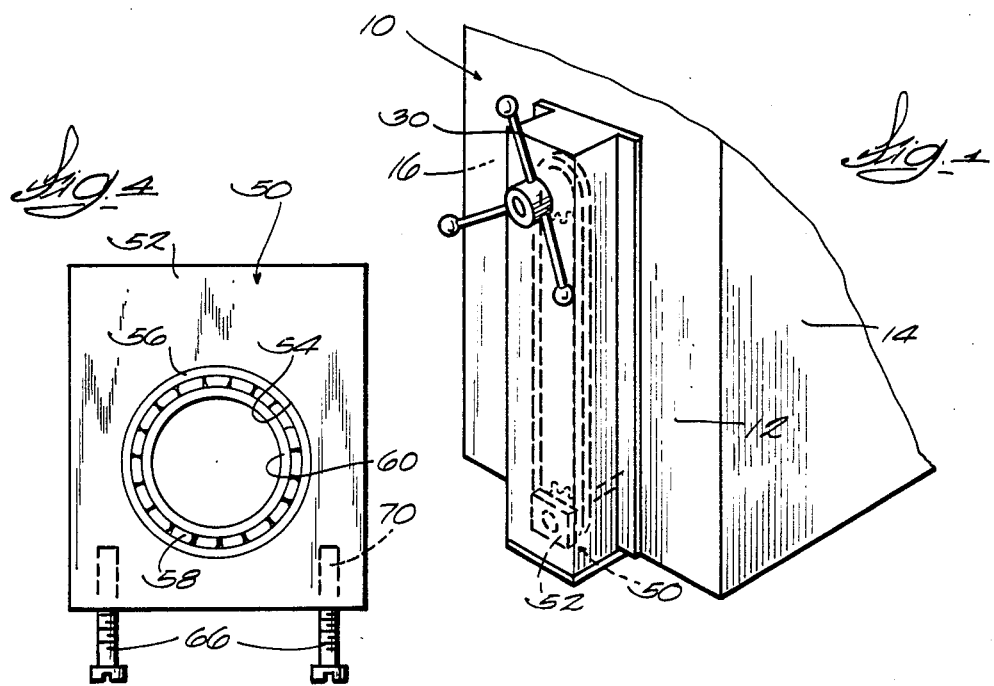
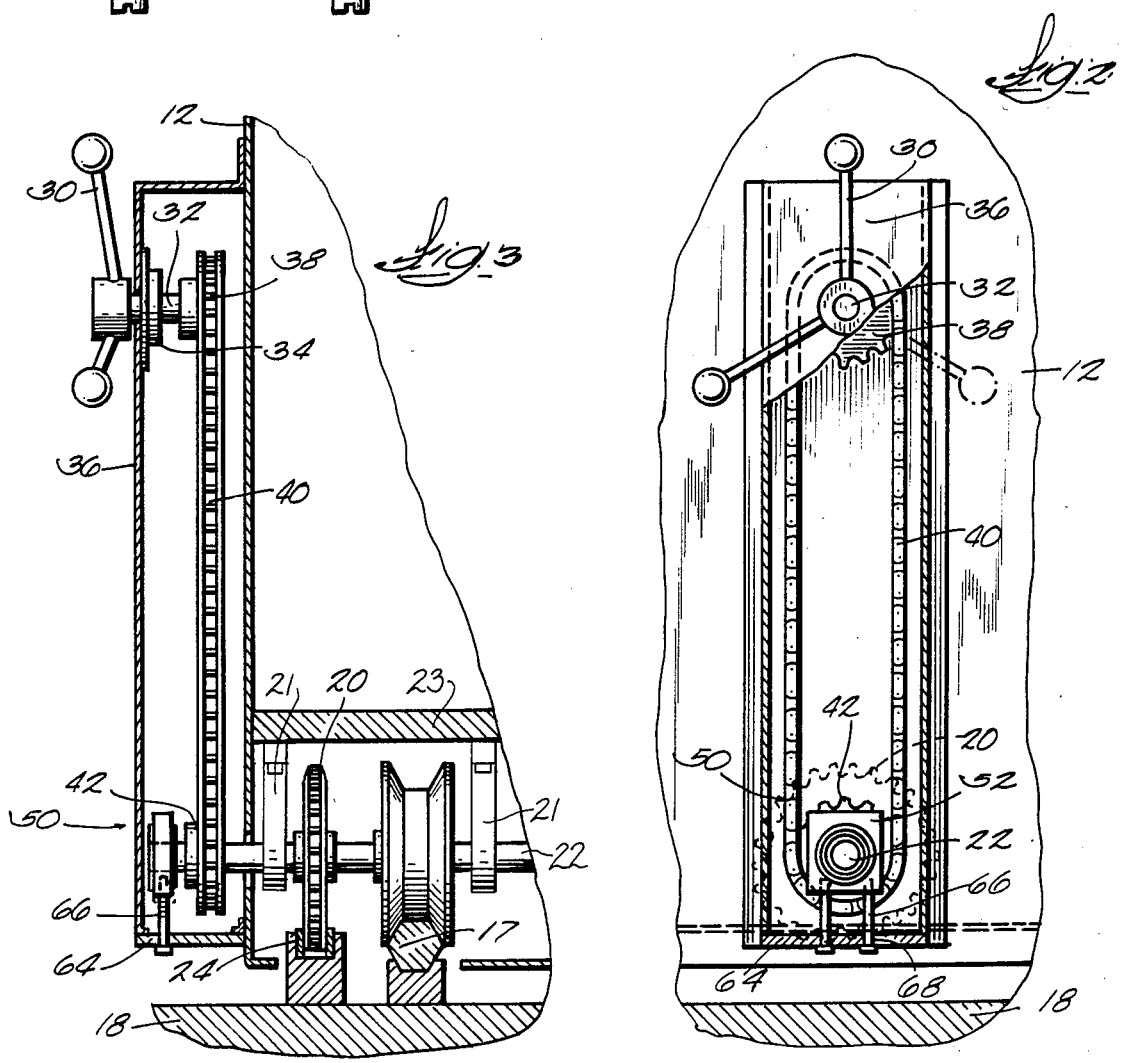

CHAIN TIGHTENER FOR DRIVE CHAIN

This application is a continuation-in-part of application Ser. No. 380,653, filed May 21, 1982, now abandoned.

BACKGROUND OF THE INVENTION

Mobile shelving apparatus employs a plurality of mobile units which move in rectilinear fashion and are guided for movement by tracks supported on the floor. Some apparatus of this character employs reversible drive motors for driving each unit. U.S. Pat. No. 3,640,595 is illustrative of a system of that type. Other systems use a positive manual drive with a manual wheel or crank operable by the user.

SUMMARY OF THE INVENTION

The invention provides a chain tensioning device for a manually operable storage apparatus so that slack can easily be taken out of the chain and provide a positive feel to the handle. The device is adapted to be retro-fitted to existing installations and includes a ball bearing assembly with an outer race in a press fit in a mounting block, with the inner race sized to be journalled on the drive shaft of the unit. Bolts threadably received in the mounting block are engaged with a base plate, whereupon tightening of the bolts draws the mounting block against the bolt support to slightly deflect the drive shaft and tighten the chain.

Further objects, advantages and features of the invention will be apparent from the disclosure.

DESCRIPTION OF THE DRAWINGS

FIG. 1 is a fragmentary perspective view of mobile storage apparatus provided with the chain tensioning device of the invention.

FIG. 2 is an enlarged end view of the apparatus shown in FIG. 1.

FIG. 3 is an enlarged side elvational view of the apparatus shown in FIGS. 1 and 2.

FIG. 4 is an enlarged view of the bearing block.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a mobile storage unit 10 having an end face 12 and sides 14 and 16 which typically are provided with shelving for storage of materials. As illustrated in FIG. 3, the storage unit is guided for movement by a guide track 17 anchored to the building floor 18. A positive driving connection to the building floor can be employed using a sprocket 20 connected on drive shaft 22 which engages a sprocket chain 24 which is secured to the floor 18 in a plane parallel to the floor. The shaft 22 and sprocket 20 are driven by a manually operable crank handle, spoke or wheel 30 supported on a shaft 32 which is rotatably supported by a bearing 34 on a panel or housing channel 36. A first sprocket 38 is fixed to shaft 32 and connected by a chain 40 to a second sprocket 42 to rotate the shaft 22 and sprocket 20. Fixed shaft supports are provided to rotatably support the shaft 22. The fixed shaft supports can be pillow blocks 21 mounted on the storage unit panel as shown in our U.S. Pat. No. 3,640,595, FIG. 11 and described at column 3, lines 19-24 of the latter patent which is incorporated herein by reference.

In accordance with the invention, a chain tensioning device 50 is disclosed which includes a bearing block 52 which has an aperture 54 which receives the outer race 56 of a roller bearing 58. The outer race can be in a press fit in the aperture 54. The inner race 60 is journalled on the shaft 22. The bearing block 52 is connected to a support block 64 by bolts 66 which extend through apertures 68 in the block 64 and are threadably received in threaded apertures 70 in the block. Tightening the bolts 66 causes tension against the end of the shaft 22 to deflect the shaft, but the ball bearings permit free rotation of shaft 22. Tightening the bolts 66 will draw up the chain to take the slack out of the chain and provide the desired tension and feel to the wheel 30.

The chain tensioning device of the invention is designed to be retro-fitted by field installation to existing units. The bearing block is readily slipped over the free end of the shaft 22 and the block positioned at the end of the housing channel 36.

I claim:

1. In a mobile storage apparatus adapted for rectilinear movement along guide tracks and having a frame; an elongated shaft mounted for rotation in the frame within a plurality of fixed shaft supports; drive means on the shaft for driving the mobile storage apparatus along the guide tracks; a manually operable member; a first sprocket on the manually operable member; a second sprocket on the shaft; and a chain connecting the sprockets, the improvement comprising;

deflecting means for deflecting the shaft relative to the fixed shaft supports at a location adjacent the second sprocket and remote from the fixed shaft supports to adjust the tension of the chain without moving the fixed shaft supports.

2. The improvement of claim 1 wherein the deflecting means comprises:

(a) bearing means journalled on the shaft at a location adjacent the second sprocket and remote from the fixed shaft supports; and (b) support means for pressing the bearing means against the shaft to deflect the shaft.

3. The improvement of claim 2 wherein:

(a) the bearing means comprises a bearing block with an aperture, and a roller bearing having an outer race supported in the aperture and an inner race journalled on the shaft; and (b) the support means comprises a bolt support attached to the frame, and at least one bolt extending through the bolt support and threadably received in the bearing block.

4. The improvement of claim 2 wherein the bearing means is journalled on the shaft outboard of the fixed shaft supports.

* * * * *